United States Patent
Wang et al.

(10) Patent No.: US 11,870,686 B2
(45) Date of Patent: Jan. 9, 2024

(54) ROUTING INFORMATION PROCESSING METHOD AND APPARATUS

(71) Applicant: Huawei Technologies Co., Ltd., Shenzhen (CN)

(72) Inventors: Haibo Wang, Beijing (CN); Wenyan Li, Beijing (CN); Sheng Fang, Beijing (CN); Lili Wang, Beijing (CN); Huizhi Wen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/854,539

(22) Filed: Jun. 30, 2022

(65) Prior Publication Data

US 2022/0337515 A1    Oct. 20, 2022

Related U.S. Application Data

(63) Continuation of application No. PCT/CN2020/119037, filed on Sep. 29, 2020.

(30) Foreign Application Priority Data

Dec. 31, 2019 (CN) .......................... 201911403419.0

(51) Int. Cl.
*H04L 45/42* (2022.01)
*H04L 45/02* (2022.01)
(Continued)

(52) U.S. Cl.
CPC .............. *H04L 45/42* (2013.01); *H04L 45/02* (2013.01); *H04L 45/22* (2013.01); *H04L 45/28* (2013.01)

(58) Field of Classification Search
CPC ......... H04L 45/42; H04L 45/02; H04L 45/22; H04L 45/28; H04L 45/24
See application file for complete search history.

(56) References Cited

U.S. PATENT DOCUMENTS 8,787,149 B1 * 7/2014 Ramanathan ........... H04L 45/58
370/216
9,019,814 B1 * 4/2015 Mohanty ................. H04L 45/00
370/219
(Continued)

FOREIGN PATENT DOCUMENTS

CN     104135420 A    11/2014
CN     107113237 A     8/2017
(Continued)

OTHER PUBLICATIONS

Sun Jie et al, "Dual-homing protection scheme and its realization in metropolitan area optical network," 2016, 4 pages.
(Continued)

*Primary Examiner* — Jimmy H Tran
(74) *Attorney, Agent, or Firm* — Conley Rose, P.C.

(57) ABSTRACT

A routing information processing method and apparatus. The method includes a first network device determines a first segment identifier corresponding to a second network device and a first locator. The first network device determines a second segment identifier corresponding to a third network device and a second locator. The first network device sends routing information that includes the first segment identifier and the second segment identifier. A fourth network device advertises mirror routing information specific to the first network device, where the mirror routing information includes the second segment identifier or the second locator.

20 Claims, 7 Drawing Sheets

CE: customer edge node
PE: provider edge node
P: provider backbone node
VRF: VPN routing and forwarding table

(51) Int. Cl.
  *H04L 45/00* (2022.01)
  *H04L 45/28* (2022.01)

(56) References Cited

U.S. PATENT DOCUMENTS

| | | | | |
|---|---|---|---|---|
| 9,178,816 | B1* | 11/2015 | Ojha | H04L 12/4641 |
| 9,397,931 | B1* | 7/2016 | Mohanty | H04L 45/28 |
| 10,142,129 | B1* | 11/2018 | Gupta | H04L 45/66 |
| 10,237,177 | B2* | 3/2019 | Akashi | H04L 61/103 |
| 10,250,552 | B1* | 4/2019 | Sajassi | H04L 41/0663 |
| 10,263,839 | B2* | 4/2019 | Li | H04L 41/0806 |
| 10,432,515 | B1* | 10/2019 | Sajassi | H04L 45/50 |
| 11,032,197 | B2* | 6/2021 | Nainar | H04L 45/28 |
| 2010/0074268 | A1* | 3/2010 | Raza | H04L 45/02 370/400 |
| 2010/0208617 | A1* | 8/2010 | Dong | H04W 60/005 370/254 |
| 2012/0213222 | A1* | 8/2012 | Filsfils | H04L 12/4641 370/392 |
| 2013/0080602 | A1* | 3/2013 | Keesara | H04L 12/4633 709/220 |
| 2013/0107887 | A1* | 5/2013 | Pearson | H04L 45/04 370/401 |
| 2013/0259058 | A1* | 10/2013 | Vairavakkalai | H04L 45/04 370/401 |
| 2016/0142963 | A1* | 5/2016 | Salkintzis | H04L 45/308 370/329 |
| 2016/0191374 | A1* | 6/2016 | Singh | H04L 45/22 370/228 |
| 2016/0378606 | A1* | 12/2016 | Sajassi | H04L 45/22 714/4.2 |
| 2017/0063600 | A1* | 3/2017 | Singh | H04L 12/18 |
| 2017/0141963 | A1* | 5/2017 | Chalapathy | H04L 49/25 |
| 2017/0195210 | A1* | 7/2017 | Jacob | H04L 45/02 |
| 2017/0223103 | A1* | 8/2017 | Keesara | H04L 67/1095 |
| 2017/0223104 | A1* | 8/2017 | Keesara | H04L 43/062 |
| 2018/0069727 | A1* | 3/2018 | Keesara | H04L 45/28 |
| 2018/0191610 | A1* | 7/2018 | Sivaraj | H04W 48/16 |
| 2018/0287990 | A1* | 10/2018 | Bickhart | H04L 45/02 |
| 2018/0309596 | A1* | 10/2018 | Brissette | H04L 12/4679 |
| 2018/0359178 | A1* | 12/2018 | Brissette | H04L 45/22 |
| 2019/0132241 | A1* | 5/2019 | Vattem | H04L 12/4633 |
| 2019/0149456 | A1* | 5/2019 | Brissette | H04L 12/4641 370/225 |
| 2019/0229937 | A1* | 7/2019 | Nagarajan | H04L 12/18 |
| 2019/0356599 | A1* | 11/2019 | Brissette | H04L 47/25 |
| 2020/0004635 | A1* | 1/2020 | Sajassi | H04L 45/28 |
| 2020/0014557 | A1* | 1/2020 | Wang | H04L 45/02 |
| 2020/0014623 | A1* | 1/2020 | Wang | H04L 45/033 |
| 2020/0296025 | A1* | 9/2020 | Wang | H04L 12/4633 |
| 2020/0296039 | A1* | 9/2020 | Srinivasan | H04L 45/586 |
| 2020/0322183 | A1* | 10/2020 | Lin | H04L 45/66 |
| 2020/0328968 | A1* | 10/2020 | Kanjariya | H04L 12/4633 |
| 2020/0382394 | A1* | 12/2020 | Kalburgi | H04L 45/22 |
| 2021/0099400 | A1* | 4/2021 | Elizabeth | H04L 45/66 |
| 2021/0152593 | A1* | 5/2021 | Gao | H04L 63/1441 |
| 2021/0250294 | A1* | 8/2021 | Wang | H04L 12/4641 |
| 2022/0131721 | A1* | 4/2022 | Boutros | H04L 45/22 |
| 2022/0231906 | A1* | 7/2022 | He | H04L 12/462 |
| 2022/0247670 | A1* | 8/2022 | Dong | H04L 45/02 |
| 2022/0247679 | A1* | 8/2022 | Andhe | H04L 47/34 |
| 2022/0329458 | A1* | 10/2022 | Zhuang | H04L 45/04 |
| 2023/0031683 | A1* | 2/2023 | He | H04L 12/4645 |
| 2023/0090072 | A1* | 3/2023 | Mishra | H04L 12/1886 |

FOREIGN PATENT DOCUMENTS

| | | |
|---|---|---|
| CN | 108696414 A | 10/2018 |
| CN | 108696416 A | 10/2018 |
| CN | 109873760 A | 6/2019 |
| CN | 110505152 A | 11/2019 |
| CN | 111901235 A | 11/2020 |
| CN | 112769587 A | 5/2021 |
| CN | 114363114 A | 4/2022 |
| WO | 2020244304 A1 | 12/2020 |

OTHER PUBLICATIONS

Y. Wang, et al, "Multi-Homing in Unlicensed LTE Networks," 2018 IEEE International Conference on Communications (ICC), 2018, 6 pages.

A. Sajassi, Ed. et al., "BGP MPLS-Based Ethernet VPN," RFC 7432, Feb. 2015, 56 pages.

Z. Hu et al., SRv6 Path Egress Protection, draft-hu-rtgwg-srv6-egress-protection-03, May 1, 2020, 13 pages.

Sajassi A et al., BGP MPLS-Based ethernet VPN, Internet Engineering Task Force (IETF), Feb. 2015, 56 pages.

* cited by examiner

ROUTING INFORMATION PROCESSING METHOD AND APPARATUS

CROSS-REFERENCE TO RELATED APPLICATIONS

This application is a continuation of International Patent Application No. PCT/CN2020/119037, filed on Sep. 29, 2020, which claims priority to Chinese Patent Application No. 201911403419.0, filed on Dec. 31, 2019. The disclosures of the aforementioned applications are hereby incorporated by reference in their entireties.

TECHNICAL FIELD

The present disclosure relates to the field of communications technologies, and in particular, to a routing information processing method and apparatus.

BACKGROUND

In an Internet Protocol (IP) network traffic forwarding scenario of Internet Protocol version 6 (IPv6), a network device A configures a virtual private network segment identifier (VPNSID), and uses the VPNSID to advertise routing information. A network device B configures mirror protection for a locator of the network device A. The network device B configures a mirror-segment identifier (SID) to advertise a mirror message, thereby declaring protection for the locator of the network device A and configuring mirror protection for the network device A.

In a scenario in which single-homing and multi-homing coexist and a fault occurs, a provider router (P) directly connected to the network device A perceives occurrence of the fault, performs mirror protection, encapsulates, into a packet, the mirror-SID configured by the network device B, and forwards an encapsulated packet to the network device B. For a packet destined for a network device C single-homed to the network device A, after the network device B receives the packet into which the mirror-SID is encapsulated, the network device B directly discards a packet destined for the network device A, to prevent a traffic loop. This causes traffic interruption. However, actually, in a scenario in which a link between the network device A and the P is faulty and the network device A is not faulty, a packet may reach the network device A through the network device B and then reach the network device C, but the network device B discards the packet. Consequently, in the scenario in which single-homing and multi-homing coexist, traffic of the network device that is not faulty and that is accessed in a single-homed manner is interrupted.

SUMMARY

This application provides a routing information processing method and apparatus, to resolve the following problem in a conventional technology: In a single-homing and multi-homing scenario, traffic of a network device that is not faulty and that is accessed in a single-homed manner is interrupted.

According to a first aspect, an embodiment of this application provides a routing information processing method, including a first network device determines a first segment identifier corresponding to a second network device, where the first network device is a single-homing device of the second network device, and the first segment identifier corresponds to a first locator. The first network device determines a second segment identifier corresponding to a third network device, where the first network device is a multi-homing device of the third network device, and the second segment identifier corresponds to a second locator. The first network device sends routing information, where the routing information includes a first device identifier of the second network device and the first segment identifier corresponding to the first device identifier, and a second device identifier of the third network device and the second segment identifier corresponding to the second device identifier. Alternatively, the first network device sends first routing information and second routing information, where the first routing information includes a first device identifier of the second network device and the first segment identifier corresponding to the first device identifier, and the second routing information includes a second device identifier of the third network device and the second segment identifier corresponding to the second device identifier. A fourth network device receives the routing information or receives the first routing information and the second routing information. The fourth network device advertises mirror routing information specific to the first network device. The mirror routing information includes the second segment identifier, and does not include the first segment identifier. Alternatively, the mirror routing information includes the second locator corresponding to the second segment identifier, and does not include the first locator corresponding to the first segment identifier.

In this method, the fourth network device establishes mirror protection for the second segment identifier or the second locator of the third network device that is a multi-homed network device, and does not establish mirror protection for the first segment identifier or the first locator of the second network device that is a single-homed network device. Therefore, in a scenario in which single-homing and multi-homing coexist, if the first network device is not faulty, a packet destined for the second network device may be sent to a link to the second network device, in an attempt to determine whether the link is faulty, and when the link is not faulty, the packet can be successfully sent to the second network device through the first network device. In this way, it is ensured that traffic of the network device that is not faulty and that is accessed in a single-homed manner is not interrupted in the scenario in which single-homing and multi-homing coexist.

In a possible implementation, the first locator and the second locator are in a same locator pool, and the first locator is different from the second locator.

In this implementation, the first network device dynamically allocates, to the single-homed and multi-homed network devices based on single-homing and multi-homing information and the independent single-homing and multi-homing locators, the segment identifiers corresponding to the corresponding locators, so that protection can be effectively performed for a case in which single-homing and multi-homing coexist.

In a possible implementation, that the first network device determines a second segment identifier corresponding to a third network device further includes the first network device may receive third routing information sent by the fourth network device, where the third routing information includes a device identifier of the third network device; the first network device determines, based on the third routing information, that the fourth network device is a multi-homing device of the third network device; and the first network device determines, based on the fact that the fourth network device is the multi-homing device of the third network device, the second segment identifier corresponding to the third network device.

In this implementation, the first network device may further dynamically allocate, within the locator corresponding to the multi-homed network device, the segment identifier based on multi-homing information obtained through updating. This further improves system robustness.

In a possible implementation, the method further includes the first network device may further receive a plurality of pieces of routing information. The first network device determines, based on the plurality of pieces of routing information, that all of a plurality of network devices corresponding to the plurality of pieces of routing information are multi-homing devices of the third network device. That the first network device determines a second segment identifier corresponding to a third network device further includes the first network device may determine, based on one or more of the plurality of network devices, the second segment identifier corresponding to the third network device.

In this implementation, the first network device may make full use of allocated locators, to save resources effectively and implement mirror protection in the scenario in which single-homing and multi-homing coexist.

In a possible implementation, the method further includes the first network device may further receive a packet that is forwarded by the fourth network device and that is sent by a fifth network device, where a destination network device of the packet is the second network device, and a link between the fifth network device and the first network device is faulty. The first network device sends the packet to the second network device.

In this implementation, in the scenario in which single-homing and multi-homing coexist, the destination network device of the packet serves as a network device that accesses, in the single-homed manner, the network device that is not faulty, so that the packet can be successfully sent to the destination network device when a link to the destination network device is faulty. This avoids interruption of traffic of the network device that is not faulty and that is accessed in the single-homed manner.

In a possible implementation, that the first network device sends routing information further includes the first network device may send the routing information by using an interior gateway protocol (IGP) protocol. Alternatively, that the first network device sends first routing information and second routing information further includes the first network device sends the first routing information and the second routing information by using an IGP protocol.

In this implementation, the first network device may advertise, by using the IGP, the segment identifiers corresponding to the locators dynamically allocated from the locator pool, to effectively advertise the segment identifiers by using an IGP protocol mechanism, thereby ensuring compatibility of a running system.

According to a second aspect, an embodiment of this application provides a routing information processing method. A first network device and a third network device are multi-homing devices of a second network device. The third network device is a single-homing device of a fourth network device. The method includes the first network device receives routing information sent by the third network device, where the routing information includes a first device identifier of the fourth network device and a first segment identifier corresponding to the first device identifier, and a second device identifier of the second network device and a second segment identifier corresponding to the second device identifier. Alternatively, the first network device receives first routing information and second routing information that are sent by the third network device, where the first routing information includes a first device identifier of the fourth network device and a first segment identifier corresponding to the first device identifier, and the second routing information includes a second device identifier of the second network device and a second segment identifier corresponding to the second device identifier. The first network device advertises mirror routing information specific to the third network device, where the mirror routing information includes the second segment identifier, and does not include the first segment identifier; or the mirror routing information includes a second locator corresponding to the second segment identifier, and does not include a first locator corresponding to the first segment identifier.

In this method, the first network device establishes mirror protection for the second segment identifier or the second locator of the second network device that is a multi-homed network device, and does not establish mirror protection for the first segment identifier or the first locator of the fourth network device that is a single-homed network device. Therefore, in a scenario in which single-homing and multi-homing coexist, if the third network device is not faulty, because the fourth network device serves as a network device that accesses, in a single-homed manner, the third network device that is not faulty, a packet destined for the fourth network device may be sent to a link to the fourth network device, in an attempt to determine whether the link is faulty, and when the link is not faulty, the packet can be successfully sent to the fourth network device through the third network device. In this way, it is ensured that traffic of the network device that is not faulty and that is accessed in the single-homed manner is not interrupted in the scenario in which single-homing and multi-homing coexist, and protection can be effectively performed for both a single-homing scenario and a multi-homing scenario.

In a possible implementation, before the first network device receives the routing information or the second routing information, the method further includes the first network device may further receive third routing information, where the third routing information includes the second device identifier of the second network device and the first segment identifier corresponding to the second device identifier. The first network device determines, based on the first routing information and the third routing information that are received, that the first segment identifier corresponds to the second network device and the fourth network device. The first network device does not advertise the mirror routing information specific to the third network device.

In this implementation, if the first network device determines that the first segment identifier in the third routing information corresponds to both the single-homed network device and the multi-homed network device, the first network device does not establish mirror protection for the first segment identifier. In this way, when the first network device does not definitely know whether the first segment identifier is used by the single-homed network device or the multi-homed network device, incorrect establishment of mirror protection can be avoided, thereby further improving system robustness.

In a possible implementation, before the first network device receives the second routing information, the method further includes the first network device may further send fourth routing information to the third network device, where the fourth routing information is used to indicate a route to the second network device.

In this implementation, the first network device sends the fourth routing information. With the fourth routing information received by the third network device, the second segment identifier corresponding to the multi-homed network device can be accurately allocated to the second network device, thereby better implementing mirror protection in the scenario in which single-homing and multi-homing coexist.

In a possible implementation, the method further includes the first network device receives fifth routing information, where the fifth routing information includes a third device identifier of a fifth network device and a third segment identifier corresponding to the third device identifier, and the third segment identifier corresponds to the second locator.

That the first network device advertises mirror routing information specific to the third network device, where the mirror routing information includes a second locator corresponding to the second segment identifier, and does not include a first locator corresponding to the first segment identifier includes the first network device determines the second locator obtained by aggregating the second segment identifier and the third segment identifier; and the first network device advertises the mirror routing information specific to the third network device, where the mirror routing information includes the second locator obtained through the aggregation, and does not include the first locator corresponding to the first segment identifier.

In this implementation, the first network device may aggregate the segment identifiers of the multi-homed network devices, and dynamically advertise the mirror protection information of the corresponding locator with reference to the locator obtained by aggregating the segment identifiers, thereby saving network resources.

In a possible implementation, the method further includes the first network device may further receive a packet sent by a sixth network device, where a destination network device of the packet is the fourth network device, and a link between the sixth network device and the third network device is faulty. The first network device sends the packet to the third network device.

According to a third aspect, an embodiment of this application further provides a routing information processing apparatus. The routing information processing apparatus has a function of implementing the network device in any one of the first aspect or the method implementations of the first aspect, and includes corresponding parts (means) configured to perform steps or functions described in each corresponding method. The steps or functions may be implemented by using software, hardware (for example, a circuit), or a combination of hardware and software. The network device includes a first network device.

In a possible design, the apparatus includes one or more processing units and a transceiver unit. The one or more processing units are configured to support the apparatus in performing corresponding functions of the network device in the foregoing method.

Specifically, the processing unit is configured to determine a first segment identifier corresponding to a second network device, where the first network device is a single-homing device of the second network device, and the first segment identifier corresponds to a first locator; and determine a second segment identifier corresponding to a third network device, where the first network device is a multi-homing device of the third network device, and the second segment identifier corresponds to a second locator.

The transceiver unit is configured to send routing information, where the routing information includes a first device identifier of the second network device and the first segment identifier corresponding to the first device identifier, and a second device identifier of the third network device and the second segment identifier corresponding to the second device identifier; or send first routing information and second routing information, where the first routing information includes a first device identifier of the second network device and the first segment identifier corresponding to the first device identifier, and the second routing information includes a second device identifier of the third network device and the second segment identifier corresponding to the second device identifier.

In a possible implementation, the transceiver unit is further configured to receive third routing information sent by a fourth network device, where the third routing information includes a device identifier of the third network device.

The processing unit is further configured to determine, based on the third routing information, that the fourth network device is a multi-homing device of the third network device; and determine, based on the fact that the fourth network device is the multi-homing device of the third network device, the second segment identifier corresponding to the third network device.

In a possible implementation, the transceiver unit is further configured to receive a plurality of pieces of routing information.

The processing unit is further configured to determine, based on the plurality of pieces of routing information, that all of a plurality of network devices corresponding to the plurality of pieces of routing information are multi-homing devices of the third network device; and determine, based on one or more of the plurality of network devices, the second segment identifier corresponding to the third network device.

In a possible implementation, the transceiver unit is further configured to receive a packet that is forwarded by the fourth network device and that is sent by a fifth network device, where a destination network device of the packet is the second network device, and a link between the fifth network device and the first network device is faulty; and send the packet to the second network device.

According to a fourth aspect, an embodiment of this application further provides a routing information processing apparatus. The routing information processing apparatus has a function of implementing the network device in any one of the second aspect or the method implementations of the second aspect, and includes corresponding parts (means) configured to perform steps or functions described in each corresponding method. The steps or functions may be implemented by using software, hardware (for example, a circuit), or a combination of hardware and software. The network device includes a first network device.

In a possible implementation, the apparatus includes one or more processing units and a transceiver unit. The one or more processing units are configured to support the apparatus in performing corresponding functions of the network device in the foregoing method.

Further, the transceiver unit is configured to receive routing information sent by a third network device, where the routing information includes a first device identifier of a fourth network device and a first segment identifier corresponding to the first device identifier, and a second device identifier of a second network device and a second segment identifier corresponding to the second device identifier; or receive first routing information and second routing information that are sent by the third network device, where the first routing information includes a first device identifier of the fourth network device and a first segment identifier corresponding to the first device identifier, the second routing information includes a second device identifier of the second network device and a second segment identifier corresponding to the second device identifier, the first network device and the third network device are multi-homing devices of the second network device, and the third network device is a single-homing device of the fourth network device.

The processing unit is configured to advertise mirror routing information specific to the third network device, where the mirror routing information includes the second segment identifier, and does not include the first segment identifier; or the mirror routing information includes a second locator corresponding to the second segment identifier, and does not include a first locator corresponding to the first segment identifier.

In a possible implementation, the transceiver unit is further configured to receive third routing information, where the third routing information includes the second device identifier of the second network device and the first segment identifier corresponding to the second device identifier.

The processing unit is further configured to determine, based on the first routing information and the third routing information that are received, that the first segment identifier corresponds to the second network device and the fourth network device, and skip, by the first network device, advertising the mirror routing information specific to the third network device.

In a possible implementation, the transceiver unit is further configured to send fourth routing information to the third network device, where the fourth routing information is used to indicate a route to the second network device.

In a possible implementation, the transceiver unit is further configured to receive fifth routing information, where the fifth routing information includes a third device identifier of a fifth network device and a third segment identifier corresponding to the third device identifier, and the third segment identifier corresponds to the second locator.

The processing unit is further configured to determine the second locator obtained by aggregating the second segment identifier and the third segment identifier; and advertise the mirror routing information specific to the third network device, where the mirror routing information includes the second locator obtained through the aggregation, and does not include the first locator corresponding to the first segment identifier.

In a possible implementation, the transceiver unit is further configured to receive a packet sent by a sixth network device, where a destination network device of the packet is the fourth network device, and a link between the sixth network device and the third network device is faulty; and send the packet to the third network device.

According to a fifth aspect, an embodiment of this application further provides a routing information processing apparatus. The routing information processing apparatus includes a processor and a memory. The processor is coupled to the memory.

The memory is configured to store a computer program.

The processor is configured to execute the computer program stored in the memory, so that the apparatus performs the following operations:

determining a first segment identifier corresponding to a second network device, where the first network device is a single-homing device of the second network device, and the first segment identifier corresponds to a first locator; determining a second segment identifier corresponding to a third network device, where the first network device is a multi-homing device of the third network device, and the second segment identifier corresponds to a second locator; and sending routing information, where the routing information includes a first device identifier of the second network device and the first segment identifier corresponding to the first device identifier, and a second device identifier of the third network device and the second segment identifier corresponding to the second device identifier; or sending first routing information and second routing information, where the first routing information includes a first device identifier of the second network device and the first segment identifier corresponding to the first device identifier, and the second routing information includes a second device identifier of the third network device and the second segment identifier corresponding to the second device identifier.

In a possible implementation, the first locator and the second locator are in a same locator pool, and the first locator is different from the second locator.

In a possible implementation, the processor is further configured to execute the computer program, to perform the following operations: receiving third routing information sent by a fourth network device, where the third routing information includes a device identifier of the third network device; determining, based on the third routing information, that the fourth network device is a multi-homing device of the third network device; and determining, based on the fact that the fourth network device is the multi-homing device of the third network device, the second segment identifier corresponding to the third network device.

In a possible implementation, the processor is further configured to execute the computer program, to perform the following operations: receiving a plurality of pieces of routing information; determining, based on the plurality of pieces of routing information, that all of a plurality of network devices corresponding to the plurality of pieces of routing information are multi-homing devices of the third network device; and determining, based on one or more of the plurality of network devices, the second segment identifier corresponding to the third network device.

In a possible implementation, the processor is further configured to execute the computer program, to perform the following operations: receiving a packet that is forwarded by the fourth network device and that is sent by a fifth network device, where a destination network device of the packet is the second network device, and a link between the fifth network device and the first network device is faulty; and sending the packet to the second network device.

In a possible implementation, the processor is further configured to execute the computer program, to perform the following operation: sending the routing information by using an IGP protocol; or sending the first routing information and the second routing information by using an IGP protocol.

According to a sixth aspect, an embodiment of this application further provides a routing information processing apparatus. The routing information processing apparatus includes a processor and a memory. The processor is coupled to the memory.

The memory is configured to store a computer program.

The processor is configured to execute the computer program stored in the memory, so that the apparatus performs the following operations: receiving routing information sent by a third network device, where the routing information includes a first device identifier of a fourth network device and a first segment identifier corresponding to the first device identifier, and a second device identifier of a second network device and a second segment identifier corresponding to the second device identifier; or receiving first routing information and second routing information that are sent by the third network device, where the first routing information includes a first device identifier of the fourth network device and a first segment identifier corresponding to the first device identifier, the second routing information includes a second device identifier of the second network device and a second segment identifier corresponding to the second device identifier, a first network device and the third network device are multi-homing devices of the second network device, and the third network device is a single-homing device of the fourth network device; and advertising mirror routing information specific to the third network device, where the mirror routing information includes the second segment identifier, and does not include the first segment identifier, or the mirror routing information includes a second locator corresponding to the second segment identifier, and does not include a first locator corresponding to the first segment identifier.

In a possible implementation, the processor is further configured to execute the computer program, to perform the following operations: receiving third routing information, where the third routing information includes the second device identifier of the second network device and the first segment identifier corresponding to the second device identifier; and determining, based on the first routing information and the third routing information that are received, that the first segment identifier corresponds to the second network device and the fourth network device, and skipping, by the first network device, advertising the mirror routing information specific to the third network device.

In a possible implementation, the processor is further configured to execute the computer program, to perform the following operation: sending fourth routing information to the third network device, where the fourth routing information is used to indicate a route to the second network device.

In a possible implementation, the processor is further configured to execute the computer program, to perform the following operations: receiving fifth routing information, where the fifth routing information includes a third device identifier of a fifth network device and a third segment identifier corresponding to the third device identifier, and the third segment identifier corresponds to the second locator; determining the second locator obtained by aggregating the second segment identifier and the third segment identifier; and advertising the mirror routing information specific to the third network device, where the mirror routing information includes the second locator obtained through the aggregation, and does not include the first locator corresponding to the first segment identifier.

In a possible implementation, the processor is further configured to execute the computer program, to perform the following operations: receiving a packet sent by a sixth network device, where a destination network device of the packet is the fourth network device, and a link between the sixth network device and the third network device is faulty; and sending the packet to the third network device.

According to a seventh aspect, an embodiment of this application provides a computer-readable storage medium. The computer-readable storage medium stores instructions. When the instructions are run on a computer, the computer is enabled to perform the method in any one of the first aspect, the second aspect, the possible implementations of the first aspect, or the possible implementations of the second aspect.

According to an eighth aspect, an embodiment of this application provides a computer program product. The computer program product includes computer program code. When the computer program code is run on a computer, the computer is enabled to perform the method in any one of the first aspect, the second aspect, the possible implementations of the first aspect, or the possible implementations of the second aspect.

DESCRIPTION OF EMBODIMENTS

Figure 1:
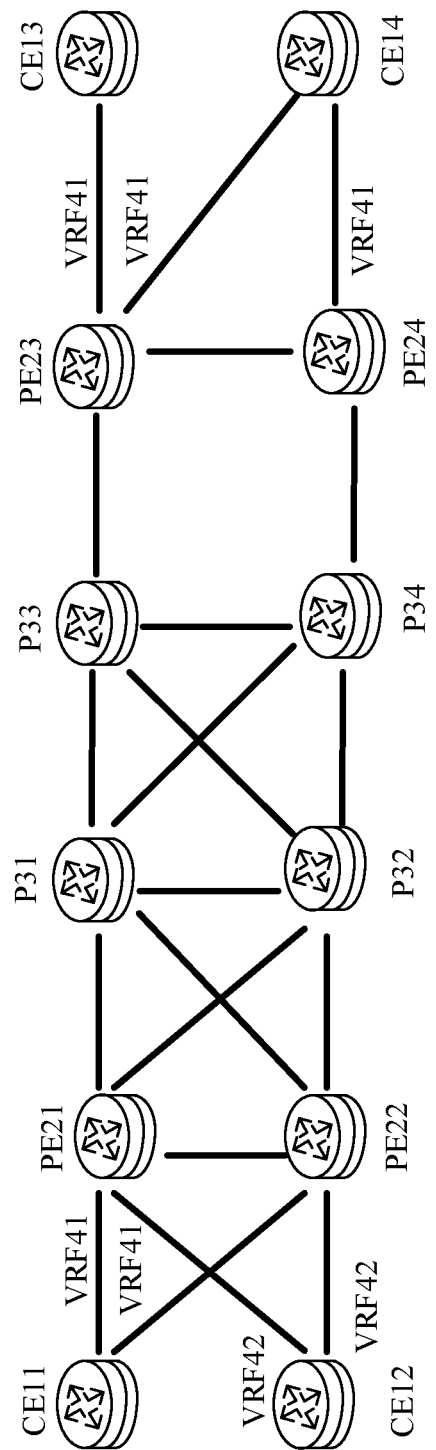
FIG. 1 is a schematic diagram of a network according to the present disclosure.

The following further describes the present disclosure in detail with reference to accompanying drawings.

All aspects, embodiments, or features are presented in the present disclosure by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of the solutions may be used.

In addition, in the embodiments of the present disclosure, the term "for example" is used to indicate an example, an example illustration, or a description. Any embodiment or design scheme described as an "example" in the present disclosure should not be explained as being more preferred or having more advantages than another embodiment or design. Exactly speaking, use of the term "for example" is intended to present a concept in a specific manner.

A network architecture and a service scenario described in embodiments of the present disclosure are intended to describe the technical solutions in embodiments of the present disclosure more clearly, and do not constitute a limitation on the technical solutions provided in embodiments of the present disclosure. A person of ordinary skill in the art may know that, with evolution of the network architecture and emergence of new service scenarios, the technical solutions provided in embodiments of the present disclosure are also applicable to similar technical problems.

The following describes some terms in embodiments of the present disclosure, to facilitate understanding by persons skilled in the art.

(1) Virtual private network (VPN): A virtual private network may include a customer edge (CE) node, a provider edge (PE) node, and a P. The CE is also referred to as a customer edge router. The PE is also referred to as a backbone-network edge router. The P is also referred to as a backbone-network core router. The network-side PE may be directly connected to the user-side CE, and is responsible for VPN service access and routing information processing. The P is responsible for data forwarding, and is not directly connected to the CE. The P may be directly connected to the PE and/or another P. In the embodiments of the present disclosure, a VPN may also be simply referred to as a network.

(2) Segment routing (SR) protocol: A segment routing protocol is a new protocol proposed based on an IGP. In the SR protocol, a segment identifier (SID) may be used to identify a network device, so that another network device can forward a packet based on an SID label carried in the packet.

(3) Packet: A packet is a data unit exchanged and transmitted in a network. A packet includes complete data information that is to be sent.

(4) Single-homing and multi-homing: In the embodiments of the present disclosure, single-homing means that a CE is connected to only one PE, in other words, a CE is single-homed to one PE; and multi-homing means that a CE is connected to a plurality of PEs, in other words, a CE is multi-homed to a plurality of PEs. If a network includes both single-homing and multi-homing, it means that single-homing and multi-homing are combined or single-homing and multi-homing coexist in the network. In the embodiments of the present disclosure, if a network device A is single-homed to another network device, the network device A is also referred to as a single-homed node, a single-homed network device, or a single-homed device; if a network device B is multi-homed to other network devices, the network device B is also referred to as a multi-homed node, a multi-homed network device, or a multi-homed device. The multi-homed network device B is simultaneously homed to two or more network devices.

(5) Virtual routing and forwarding (VRF) table: A virtual routing and forwarding table is also referred to as a VPN routing and forwarding table or a VPN instance. A VRF is a dedicated entity established and maintained by a PE for a directly connected site. Each site has a corresponding VRF on a PE, and the site may include, for example, a CE and/or a P. In addition, each VRF may be considered as a virtual router. Each VRF includes an independent routing table, a set of interfaces homed to the VRF, and a set of routing protocols used for only the VRF. A VRF may indicate a service accessed by a user. For example, a VRF1 indicates that a user accesses a service 1, and a VRF2 indicates that the user accesses a service 2. The VRF1 and the VRF2 are different, indicating that the services accessed by the user are different.

The term "and/or" in the present disclosure describes an association relationship between associated objects and indicates that three relationships may exist. For example, A and/or B may indicate the following three cases: Only A exists, both A and B exist, and only B exists. The character "/" generally indicates an "or" relationship between associated objects.

"A plurality of" in the present disclosure means two or more.

In addition, it should be understood that in description of the present disclosure, terms such as "first" and "second" are merely used for distinguishing and description, but should not be understood as an indication or implication of relative importance, or should not be understood as an indication or implication of a sequence.

For ease of understanding the embodiments of the present disclosure, the following describes possible application scenarios of the embodiments of the present disclosure.

During packet forwarding in a conventional IP network, when a packet is forwarded to a network device, the network device queries an IP routing table to determine a next-hop network device of the packet. At a head node, a user cannot definitely know a specific packet path of the packet. Therefore, when planning a network, a customer usually adds corresponding configuration information on each network device to guide packet forwarding. Based on an SR technology, the customer can directly customize a complete forwarding path of the packet.

In an IPv6 forwarding scenario, after an end-to-end SRv6 policy (namely, a segment routing policy) is deployed, for a fault of a tail node, a conventional solution is deploying VPN fast reroute (FRR). In a network structure shown in FIG. 1, a CE11 may send a packet of a service corresponding to a VRF41 to a PE21 and a PE22. The PE21 and the PE22 may send the packet of the service corresponding to the VRF41 to a P33 and/or a P34 by using a P31 and/or a P32. The P33 and/or the P34 may send the received packet to a CE13 and/or a CE14 by using a PE23 and/or a PE24. Correspondingly, a CE12 may send a packet of a service corresponding to a VRF42 to the PE21 and the PE22. The PE21 and the PE22 may send the packet of the service corresponding to the VRF42 to the P33 and/or the P34 by using the P31 and/or the P32. The P33 and/or the P34 may send the received packet to a corresponding CE (not shown in FIG. 1) by using the PE23 and/or the PE24. Processes of sending and receiving the packet of the service corresponding to the VRF41 is used as an example. In the process of sending the packet of the service corresponding to the VRF41, for a scenario in which the PE23 may be faulty, VPN FRR is deployed on the PE21 and the PE22; when the PE23 is faulty, bidirectional forwarding detection (BFD) on the PE21 and the PE22 detects that the PE23 is faulty, and the sending quickly switches to the PE24, to ensure service switching efficiency. However, in this manner, BFD is deployed on the PE21 and the PE22 based on a tunnel from the PE21 to the PE23. When a quantity of PEs is excessively large, an amount of BFD that is deployed is also quite large, and consequently, a large quantity of resources is consumed. Therefore, a tail node protection solution is proposed, to reduce resource consumption caused by BFD deployment. The network structure shown in FIG. 1 is still used as an example. In the tail node protection solution, the PE23 configures a VPNSID; a VRF1 on the PE23 advertises routing information by using the VPNSID, that is, the routing information advertised by the VRF41 carries the VPNSID; the PE24 configures mirror protection for a locator of the PE23, for example, the locator of the PE23 is 1000::/64; and the PE24 allocates a mirror-SID, and advertises mirror information, thereby declaring protection for the locator 1000::/64 of the PE23, and configuring mirror protection for the PE23. The P33 receives the mirror information advertised by the PE24, and establishes a mirror protection path for the locator 1000::/64. To be specific, during mirror protection, the mirror-SID allocated by the PE23 is replaced with a VPNSID allocated by the PE24. The PE24 receives the private-network routing information of the PE23, matches, based on the VPNSID carried in the private-network routing information of the PE23, mirror protection locally configured by the PE24, and delivers a remote routing and forwarding table, such as a remote VPNSID table. The remote routing and forwarding table stores a correspondence between the VRF41 and the mirror-SID allocated by the PE24.

In this tail node protection solution, the PE24 configures mirror protection for the PE23. In a scenario in which single-homing and multi-homing coexist and a fault occurs, for example, two comparatively common fault scenarios in which a link between the P33 and the PE23 is faulty (which is referred to as a fault 1) and the PE23 is faulty (which is referred to as a fault 2), the P33 perceives occurrence of the faults, performs mirror protection, encapsulates, into a packet, the mirror-SID allocated by the PE24, and forwards an encapsulated packet to the PE24. The PE24 searches the remote routing and forwarding table based on the mirror-SID that is allocated by the PE24 and that is encapsulated into the packet, and determines the VRF41 corresponding to the mirror-SID allocated by the PE24. For a packet destined for the CE14, the PE24 may directly send the packet to the CE14. For a packet destined for the CE13, the PE24 determines that the packet is to be further forwarded to the remote network device PE23. To prevent a traffic loop, because the PE24 determines that a remote route is hit, the PE24 directly discards a packet destined for the PE23. This causes traffic interruption. However, actually, in the scenario of the fault 1, the packet may reach the PE23 through the PE24 and then reach the CE13, but the PE24 discards the packet. As a result, traffic of the PE that is not faulty and that is accessed in a single-homed manner is interrupted in the scenario in which single-homing and multi-homing coexist.

In the foregoing scenario in which the fault occurs, a reason why the PE24 discards the packet destined for the PE23 is that the PE24 determines, after searching for a route, that the packet is to be further forwarded to the remote network device PE23. In this case, the PE24 encapsulates, into the packet, the mirror-SID allocated by the PE23. The PE24 forwards the packet to the P34, and the P34 forwards the packet to the P33. After receiving the packet, the P33 perceives occurrence of the fault, and performs mirror protection. As a result, a traffic loop occurs. The traffic loop does not stop until the P33 or the P34 completes convergence. Therefore, when the PE24 determines that the packet hits the remote network device PE23, the PE24 does not further forward the packet.

Figure 2:
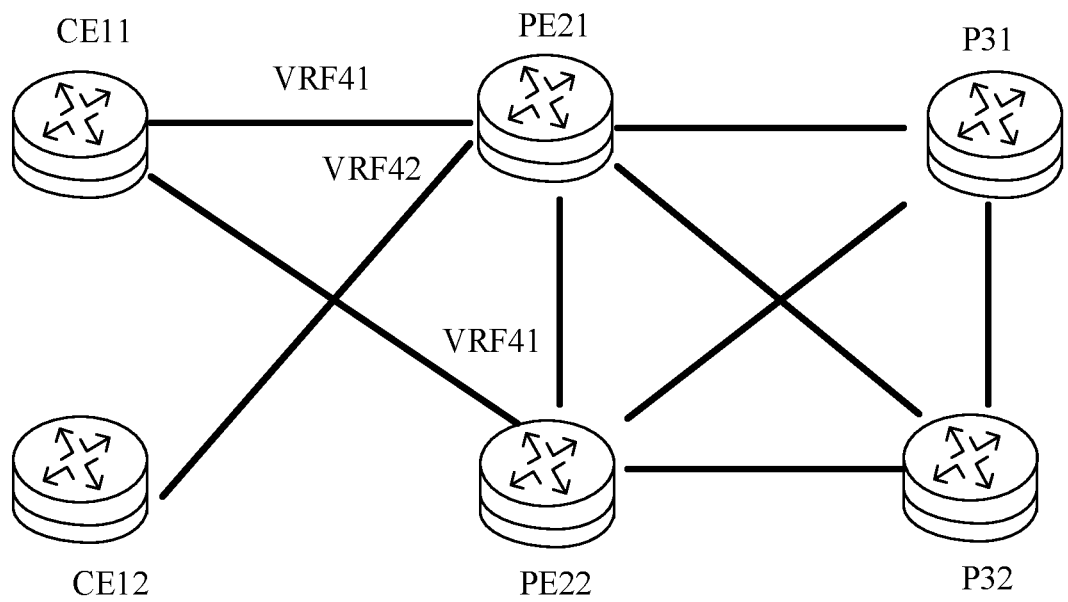
FIG. 2 is a schematic diagram of a network according to the present disclosure.

To resolve a problem that traffic of a PE that is not faulty and that is accessed in the single-homed manner is interrupted in a scenario in which single-homing and multi-homing coexist, a possible solution is shown in FIG. 2, and restricts that single-homing and dual-homing cannot coexist. To be specific, during deployment, a same VPN is controlled not to perform hybrid single-homing and multi-homing access. For example, in FIG. 2, a VRF42 is deployed in a single-homing manner, and a VRF41 is deployed in a dual-homing manner. However, a vendor cannot require a customer to distribute, during actual deployment, single-homing and dual-homing on different VRFs for deployment. Therefore, the foregoing problem still exists.

In view of this, to ensure that traffic of a network device that is not faulty and that is accessed in a single-homed manner is not interrupted in a scenario in which single-homing and multi-homing coexist, the present disclosure proposes a routing information processing method. In the method, a first network device is a single-homing device of a second network device, and determines a first segment identifier corresponding to the second network device. The first network device is a multi-homing device of a third network device, and determines a second segment identifier corresponding to the third network device. The first segment identifier and the second segment identifier correspond to different locators. The first network device sends routing information. The routing information includes the first segment identifier and the second segment identifier. Alternatively, the first network device sends first routing information and second routing information. The first routing information includes the first segment identifier, and the second routing information includes the second segment identifier. A fourth network device receives the routing information or receives the first routing information and the second routing information. The fourth network device advertises mirror routing information specific to the first network device. The mirror routing information includes the second segment identifier, and does not include the first segment identifier. Alternatively, the mirror routing information includes the second locator corresponding to the second segment identifier, and does not include the first locator corresponding to the first segment identifier. According to the method, the fourth network device establishes mirror protection for the second segment identifier or the second locator of the third network device that is a multi-homed network device, and does not establish mirror protection for the first segment identifier or the first locator of the second network device that is a single-homed network device. Therefore, in a scenario in which single-homing and multi-homing coexist, if the first network device is not faulty, a packet destined for the second network device may be sent to a link to the second network device, in an attempt to determine whether the link is faulty, and when the link is not faulty, the packet can be successfully sent to the second network device through the first network device. In this way, it is ensured that traffic of the network device that is not faulty and that is accessed in the single-homed manner is not interrupted in the scenario in which single-homing and multi-homing coexist.

A network device in the present disclosure may include one or more of a PE, a P, or a CE. The network device may be a router or a switch. Optionally, the network device in the present disclosure may support the SR protocol.

Figure 3:
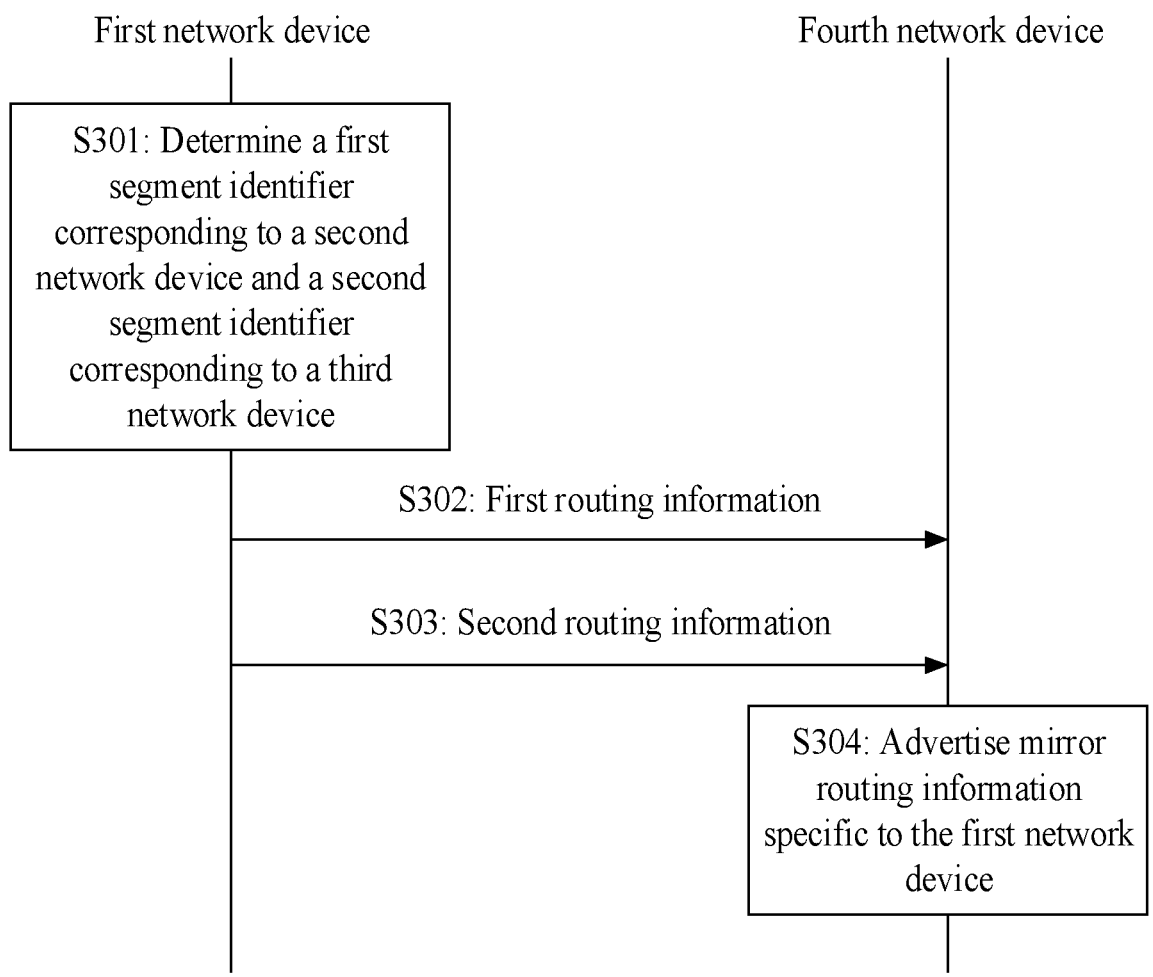
FIG. 3 is a schematic diagram of a routing information processing procedure according to an embodiment of the present disclosure.

An embodiment of the present disclosure provides a routing information processing method. The method may be applied to a network shown in FIG. 1. In an actual possible scenario, the network may further include another network device. This is not limited herein. Referring to FIG. 3, the following describes in detail a routing information processing process. For ease of understanding, for example, in the network shown in FIG. 1, a first network device may be the PE23, a second network device may be the CE13, a third network device may be the CE14, a fourth network device may be the PE24, and a fifth network device may be the P33. As shown in FIG. 3, steps are as follows.

S301: The first network device determines a first segment identifier corresponding to the second network device, where the first network device is a single-homing device of the second network device, and the first segment identifier corresponds to a first locator; and the first network device determines a second segment identifier corresponding to the third network device, where the first network device is a multi-homing device of the third network device, and the second segment identifier corresponds to a second locator.

After determining single-homed/multi-homed statuses of the second network device and the third network device, the first network device determines the segment identifiers corresponding to the second network device and the third network device. Generally, the first network device may determine the single-homed/multi-homed statuses of the second network device and the third network device based on a locally learned route and/or a route learned from another network device.

For example, the first network device may allocate the corresponding first segment identifier to the second network device based on a network segment range corresponding to the first locator, and allocate the corresponding second segment identifier to the third network device based on a network segment range corresponding to the second locator. For another example, the first network device may determine, based on several segment identifiers specified in the first locator, the first segment identifier corresponding to the second network device, and determine, based on several segment identifiers specified in the second locator, the second segment identifier corresponding to the third network device.

The first locator and the second locator are in a same locator pool, and the first locator is different from the second locator. For example, on the first network device, a locator pool is set, and the first locator corresponding to the single-homed network device and the second locator corresponding to the multi-homed network device are set. For example, the first locator corresponding to the single-homed network device is 1000::/56 locator 64, that is, the locator pool is a 56 network segment, and the locator is allocated based on a 64 network segment. The first segment identifier corresponding to the first locator may include 1000::1/64, 1000::2/64, or the like.

In addition, optionally, first locators corresponding to single-homed network devices of different VRFs may be different, and second locators corresponding to multi-homed network devices of different VRFs may be different. For example, a first locator corresponding to a single-homed network device of a VRF1 may be 1000::1/64, and a first locator corresponding to a single-homed network device of a VRF2 may be 1000::2/64. For another example, a second locator corresponding to a multi-homed network device of the VRF1 may be 2000::1/64, and a second locator corresponding to a multi-homed network device of the VRF2 may be 2000::2/64.

The first network device may determine the single-homed/multi-homed statuses of the second network device and the third network device in the following manners.

1. The first network device first allocates corresponding segment identifiers/a corresponding segment identifier to the second network device and/or the third network device based on locally existing routing information. In this case, the first network device may determine that the second network device and/or the third network device are/is single-homed network devices/a single-homed network device. Then, the first network device determines actual single-homed/multi-homed statuses of the second network device and the third network device based on routing information sent by another network device. When determining that the second network device and/or the third network device are/is actually multi-homed network devices/a multi-homed network device, the first network device re-determines segment identifiers corresponding to the second network device and the third network device.

In other words, in this manner, the first network device pre-assumes that the second network device and/or the third network device are/is single-homed network devices/a single-homed network device, and allocates the corresponding segment identifier on this basis; then, the first network device re-determines, based on the new routing information received from the another network device, that the second network device and/or the third network device are/is multi-homed network devices/a multi-homed network device, and re-determines, on this basis, the segment identifiers corresponding to the second network device and the third network device. It should be noted that, if it is found, based on the new routing information, that the second network device and/or the third network device are/is actually still single-homed network devices/a single-homed network device, the corresponding segment identifier does not need to be updated. For example, in the network shown in FIG. 1, the PE23 determines, based on routing information sent by the PE24, that the CE14 is actually a dual-homed network device, and re-determines a segment identifier corresponding to the CE14.

2. The first network device waits for specified duration, to determine the actual single-homed/multi-homed statuses of the second network device and the third network device, and then determines the segment identifiers corresponding to the second network device and the third network device. The specified duration may be any reasonable value, and is not limited in this embodiment of the present disclosure.

Within the specified duration, the first network device may receive routing information sent by another network device. The first network device may determine the single-homed/multi-homed statuses of the second network device and the third network device based on the locally learned route and the routing information sent by the other network device. For example, for the network devices shown in FIG. 1, the PE23 receives routing information sent by the PE24, and the PE23 determines that the CE14 is a dual-homed network device.

Multi-homing is used as an example to describe how the first network device determines a single-homed/multi-homed status of the third network device.

For dual-homing, that the first network device determines a second segment identifier corresponding to the third network device further includes the first network device receives third routing information sent by the fourth network device, where the third routing information includes a device identifier of the third network device; the first network device determines, based on the third routing information, that the fourth network device is a dual-homing device of the third network device; and the first network device determines, based on the fact that the fourth network device is the dual-homing device of the third network device, the second segment identifier corresponding to the third network device.

A device identifier sent by a routing information sending party includes a device identifier of a CE. Specifically, the device identifier sent by the transmit end includes a device identifier of a single-homed CE or a device identifier of a multi-homed CE. A device identifier of a CE may be identification information such as an IP address of the CE. For example, the device identifier of the third network device may be identification information such as an IP address of the third network device.

If the manner 1 is used, before the first network device receives the third routing information, the first network device may send fourth routing information. The fourth routing information includes the device identifier of the third network device and a segment identifier corresponding to the device identifier of the third network device. In addition, optionally, the segment identifier corresponding to the device identifier of the third network device may be a segment identifier that corresponds to a single-homed network device and that is determined by the first network device for the third network device.

The first network device may determine, based on the third routing information, that the third network device is multi-homed to the first network device and the fourth network device.

For triple-homing and above, the method further includes the first network device receives a plurality of pieces of routing information. The first network device determines, based on the plurality of pieces of routing information, that all of a plurality of network devices corresponding to the plurality of pieces of routing information are multi-homing devices of the third network device.

That the first network device determines a second segment identifier corresponding to the third network device further includes the first network device determines, based on one or more of the plurality of network devices, the second segment identifier corresponding to the third network device.

For example, it is assumed that a sixth network device further exists based on the network structure shown in FIG. 1, and the sixth network device, the first network device, and the fourth network device together are multi-homing devices of the third network device. In this case, if the first network device receives routing information sent by the fourth network device and the sixth network device, in a possible implementation, the first network device may determine, based on the fourth network device, the second segment identifier corresponding to the third network device; or in another possible implementation, the first network device may determine, based on the sixth network device, the second segment identifier corresponding to the third network device; or in another possible implementation, the first network device may determine, based on a combination of the fourth network device and the sixth network device, the second segment identifier corresponding to the third network device.

If the manner 1 is used, the plurality of pieces of routing information includes the device identifier of the third network device and the segment identifier that corresponds to the single-homed network device and that is determined by the first network device for the third network device.

S302: The first network device sends first routing information, and the fourth network device receives the first routing information, where the first routing information includes a first device identifier of the second network device and the first segment identifier corresponding to the first device identifier.

Optionally, the first network device sends the first routing information by using an IGP protocol.

S303: The first network device sends second routing information, and the fourth network device receives the second routing information, where the second routing information includes a second device identifier of the third network device and the second segment identifier corresponding to the second device identifier.

Optionally, the first network device sends the second routing information by using the IGP protocol.

It should be noted that, in another possible implementation, alternatively, the first network device acting as a sending party sends the first segment identifier and the second segment identifier by using one piece of routing information. In this case, the piece of routing information includes the first device identifier of the second network device and the first segment identifier corresponding to the first device identifier, and the second device identifier of the third network device and the second segment identifier corresponding to the second device identifier. Correspondingly, the fourth network device acting as a receiving party receives the piece of routing information, to obtain the first segment identifier and the second segment identifier.

S304: The fourth network device advertises mirror routing information specific to the first network device.

The fourth network device determines, based on the received second segment identifier, that the third network device is multi-homed to the first network device and the fourth network device. The fourth network device may generate mirror protection for the first network device based on the second segment identifier.

In a possible implementation, the mirror routing information includes the second segment identifier and does not include the first segment identifier, to generate mirror protection for the first network device. For example, the fourth network device advertises mirror information, and declares mirror protection for the first network device based on the second segment identifier of the third network device. For example, the mirror message advertised by the fourth network device carries the second segment identifier of the third network device, and does not carry the first segment identifier of the second network device.

In another possible implementation, the mirror routing information includes the second locator corresponding to the second segment identifier, and does not include the first locator corresponding to the first segment identifier, to generate mirror protection for the first network device. For example, the fourth network device advertises mirror information, and declares mirror protection for the first network device based on the second locator corresponding to the second segment identifier of the third network device. For example, the mirror message advertised by the fourth network device carries the second locator corresponding to the second segment identifier, and does not carry the first locator corresponding to the first segment identifier.

In this way, when a fault 1 occurs, a packet destined for the third network device hits mirror protection, and a mirror protection procedure is performed, so that the fourth network device sends the received packet to the third network device. This ensures that the third network device can normally receive the packet, thereby avoiding traffic interruption.

For a scenario in which a transmission link for a packet destined for a single-homed network device is faulty, for example, a scenario in which a link between the fifth network device and the first network device is faulty, if a destination network device of the packet is the second network device, the first network device receives the packet that is forwarded by the fourth network device and that is sent by the fifth network device, and the first network device sends the packet to the second network device.

Specifically, after the packet reaches the fifth network device, the fifth network device perceives that a link to the second network device is faulty, and consequently, the packet cannot be sent to the second network device by using the link from the fifth network device through the first network device to the second network device. The fifth network device sends the packet to the fourth network device that serves as a backup device, and the fourth network device sends the packet to the first network device. The first network device is not faulty, and therefore, the first network device sends the packet to the second network device. The first network device is the single-homing device of the second network device.

For a scenario in which a transmission link for a packet destined for a multi-homed network device is faulty, for example, a link between the fifth network device and the first network device is faulty, and/or the first network device is faulty, if a destination network device of the packet is the third network device, the fourth network device receives the packet sent by the fifth network device, and the fourth network device sends the packet to the third network device.

Specifically, after the packet reaches the fifth network device, the fifth network device perceives that a link to the third network device through the first network device is faulty, and consequently, the packet cannot be sent to the third network device by using the link from the fifth network device through the first network device to the third network device. The fifth network device determines, based on the second segment identifier in the packet, that the fourth network device has generated mirror protection based on the second segment identifier or the second locator corresponding to the second segment identifier. The fifth network device sends the packet to the fourth network device by performing the mirror protection. The fourth network device and the first network device are dual-homing devices of the third network device. After receiving the packet, the fourth network device sends the packet to the third network device.

Figure 4:
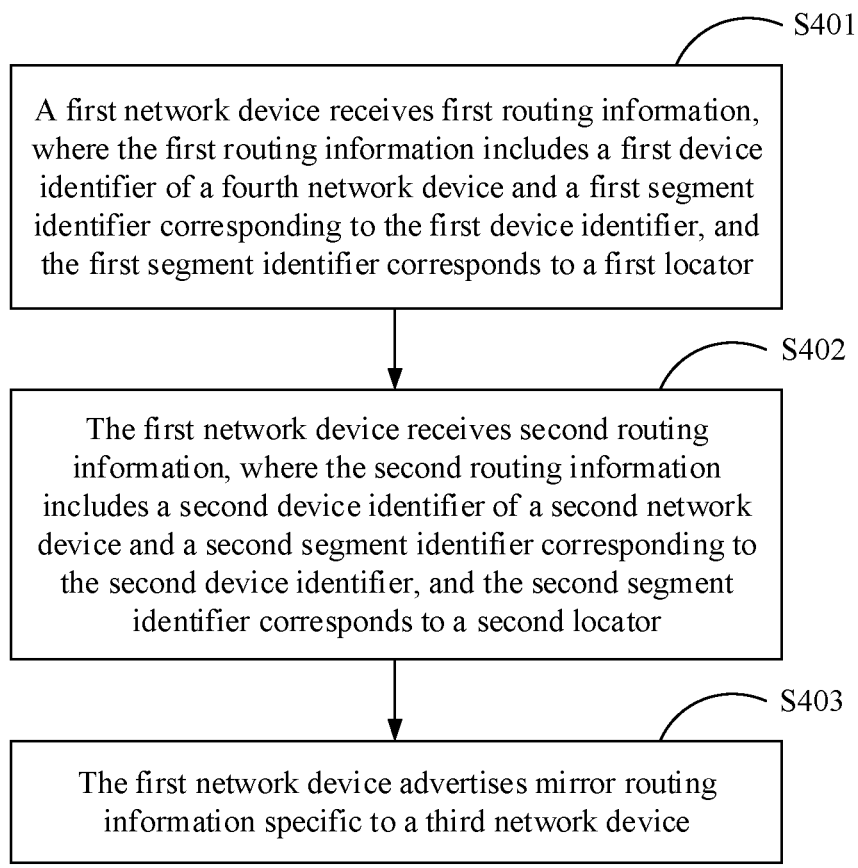
FIG. 4 is a schematic diagram of a routing information processing procedure according to an embodiment of the present disclosure.

Based on the foregoing embodiment, if the first network device is a network device that receives routing information, in a processing process of the routing information, the first network device and the third network device are multi-homing devices of the second network device, and the third network device is a single-homing device of the fourth network device. A routing information processing process is described in detail with reference to FIG. 4. For ease of understanding, for example, in the network shown in FIG. 1, a first network device may be the PE24, a second network device may be the CE14, a third network device may be the PE23, a fourth network device may be the CE13, and a sixth network device may be the P33. As shown in FIG. 4, steps are as follows.

S401: The first network device receives first routing information, where the first routing information includes a first device identifier of the fourth network device and a first segment identifier corresponding to the first device identifier, and the first segment identifier corresponds to a first locator.

The third network device is a single-homing device of the fourth network device. The first routing information is sent by the third network device. Optionally, the third network device determines that the fourth network device is a single-homed network device of the third network device, and the third network device determines the first segment identifier corresponding to the fourth network device. For a process in which the third network device determines the first segment identifier corresponding to the fourth network device, refer to the foregoing process in which the first network device determines the first segment identifier corresponding to the second network device in FIG. 3. Details are not described herein again.

S402: The first network device receives second routing information, where the second routing information includes a second device identifier of the second network device and a second segment identifier corresponding to the second device identifier, and the second segment identifier corresponds to a second locator.

The first network device and the third network device are multi-homing devices of the second network device, and the second routing information is sent by the third network device. Optionally, the third network device determines that the second network device is a multi-homed network device, and the third network device determines the second segment identifier corresponding to the second network device. For a process in which the third network device determines the second segment identifier corresponding to the second network device, refer to the foregoing process in which the first network device determines the second segment identifier corresponding to the third network device in FIG. 3. Details are not described herein again.

It should be noted that, in another possible implementation, alternatively, the third network device acting as a sending party sends the first segment identifier and the second segment identifier by using one piece of routing information; and the first network device acting as a receiving party receives the piece of routing information, to obtain the first segment identifier and the second segment identifier. In this case, the piece of routing information includes the first device identifier of the fourth network device and the first segment identifier corresponding to the first device identifier, and the second device identifier of the second network device and the second segment identifier corresponding to the second device identifier.

The first locator and the second locator are in a same locator pool, and the first locator is different from the second locator.

S403: The first network device advertises mirror routing information specific to the third network device.

The first network device may determine, based on the second segment identifier, that the first network device is a multi-homing device of the second network device, and that the third network device is a multi-homing device of the second network device. The first network device may determine that the second network device is a multi-homed network device, and the first network device may determine that the second network device is multi-homed to the first network device and the third network device. The first network device may generate mirror protection for the third network device based on the second segment identifier.

In a possible implementation, the mirror routing information includes the second segment identifier and does not include the first segment identifier, to generate mirror protection for the third network device. For example, the first network device advertises mirror information, and declares mirror protection for the third network device based on the second segment identifier of the third network device.

In another possible implementation, the mirror routing information includes the second locator corresponding to the second segment identifier, and does not include the first locator corresponding to the first segment identifier, to generate mirror protection for the third network device. For example, the first network device advertises mirror information, and declares mirror protection for the first network device based on the second locator corresponding to the second segment identifier of the third network device.

Optionally, the third network device may determine single-homed/multi-homed statuses of the second network device and the fourth network device in the following manners.

1. The third network device first allocates corresponding segment identifiers/a corresponding segment identifier to the second network device and/or the fourth network device based on locally existing routing information. In this case, the third network device may determine that the second network device and/or the fourth network device are/is single-homed network devices/a single-homed network device. Then, the third network device determines the actual single-homed/multi-homed statuses of the second network device and the fourth network device based on routing information sent by another network device. When determining that the second network device and/or the fourth network device are/is actually multi-homed network devices/a multi-homed network device, the third network device re-determines segment identifiers corresponding to the second network device and the fourth network device.

In this manner, before the first network device receives the second routing information, the first network device may further receive third routing information. The third routing information is sent by the third network device. The third routing information includes the second device identifier of the second network device and the first segment identifier corresponding to the second identifier. The first network device determines, based on the first routing information and the third routing information that are received, that the first segment identifier corresponds to the second network device and the fourth network device. The first network device does not advertise the mirror routing information specific to the third network device. In this case, the first network device determines that the first segment identifier corresponds to both a single-homed network device and a multi-homed network device, and the first network device does not establish mirror protection for the third network device based on the first segment identifier, to avoid a traffic loop.

In addition, the first network device may further send fourth routing information to the third network device. The fourth routing information is used to indicate a route to the second network device. For example, the fourth network device may include the second device identifier of the second network device and the first segment identifier corresponding to the second device information.

In other words, in this manner, the third network device pre-assumes that the second network device is a single-homed node, and allocates, on this basis, the first segment identifier corresponding to the second network device; and then, the third network device sends the third routing information to the first network device, where the third routing information includes the second device identifier of the second network device and the first segment identifier corresponding to the second network device. The first network device receives the third routing information, and the first network device sends the fourth routing information to the third network device, where the fourth routing information is used to indicate the route to the second network device. The third network device receives the fourth routing information, determines that the second network device is a multi-homed network device, and determines that the second network device is multi-homed to the first network device and the third network device. The third network device re-determines, on this basis, a segment identifier corresponding to the second network device, and the re-determined segment identifier corresponding to the second network device is the second segment identifier. Then, the third network device sends the second routing information. The second routing information includes the second device identifier of the second network device and the second segment identifier corresponding to the second device identifier.

2. The third network device waits for specified duration, to determine the actual single-homed/multi-homed statuses of the second network device and the fourth network device, and then determines the segment identifiers corresponding to the second network device and the fourth network device. The specified duration may be any reasonable value, and is not specifically limited in this embodiment of the present disclosure.

In addition, the first network device may receive fifth routing information. The fifth routing information includes a third device identifier of the fifth network device and a third segment identifier corresponding to the third device identifier, and the third segment identifier corresponds to the second locator.

That the first network device advertises mirror routing information specific to the third network device, where the mirror routing information includes the second locator corresponding to the second segment identifier, and does not include the first locator corresponding to the first segment identifier includes the first network device may further determine the second locator obtained by aggregating the second segment identifier and the third segment identifier; and the first network device advertises the mirror routing information specific to the third network device, where the mirror routing information includes the second locator obtained through the aggregation, and does not include the first locator corresponding to the first segment identifier.

For example, the second segment identifier corresponding to the second network device is 1001::1, and the third segment identifier corresponding to the fifth network device is 1001::2. In this case, the first network device may aggregate the second segment identifier and the third segment identifier, and determine that the second locator obtained through the aggregation is 1001::/64. In this way, the first network device may aggregate segment identifiers corresponding to a plurality of multi-homed nodes, and advertise corresponding mirror protection information with reference to a locator obtained by aggregating the segment identifiers, thereby saving network resources.

It should be noted that, in another possible implementation, even if the second segment identifier and the third segment identifier correspond to a locator A when being allocated or configured by the transmit-end network device, the second locator generated by aggregating the second segment identifier and the third segment identifier by the receive-end network device may be a locator B, and values of the locator A and the locator B are different. For example, if the second segment identifier and the third segment identifier have more same bits than the locator A, the locator B generated by aggregating the second segment identifier and the third segment identifier is different from the locator A. The second locator used by the receive end to advertise a mirror protection route is the locator B.

For a scenario in which a transmission link for a packet destined for a single-homed network device is faulty, for example, a scenario in which a link between the sixth network device and the third network device is faulty, if a destination network device of the packet is the fourth network device, the first network device receives the packet sent by the sixth network device, and the first network device sends the packet to the third network device.

Specifically, after the packet reaches the sixth network device, the sixth network device perceives that a link to the fourth network device is faulty, and consequently, the packet cannot be sent to the fourth network device by using the link from the sixth network device through the third network device to the fourth network device. The sixth network device sends the packet to the first network device that serves as a backup device, and the first network device sends the packet to the third network device. The third network device is not faulty, and therefore, the third network device sends the packet to the fourth network device. The third network device is the single-homing device of the fourth network device.

For a scenario in which a transmission link for a packet destined for a multi-homed network device is faulty, for example, a link between the sixth network device and the third network device is faulty, and/or the third network device is faulty, if a destination network device of the packet is the second network device, the first network device receives the packet sent by the sixth network device, and the first network device sends the packet to the second network device.

Specifically, after the packet reaches the sixth network device, the sixth network device perceives that a link to the fourth network device through the third network device is faulty, and consequently, the packet cannot be sent to the second network device by using the link from the sixth network device through the third network device to the second network device. The sixth network device determines, based on the second segment identifier in the packet, that the first network device has generated mirror protection for the second segment identifier or the second locator corresponding to the second segment identifier. The sixth network device sends the packet to the first network device by performing the mirror protection. The first network device and the third network device are dual-homing devices of the fourth network device. After receiving the packet, the first network device sends the packet to the second network device.

Based on FIG. 3 and FIG. 4, a specific routing information processing process is described in detail in an embodiment of the present disclosure. Referring to FIG. 1, the PE23 may perform, for example, the method shown in FIG. 3, and the PE24 may perform, for example, the method shown in FIG. 4. In this embodiment of the present disclosure, single-homing and dual-homing are combined in a network, and the following process is further included.

On the PE23, a locator pool is set, and a first locator (for example, 1000::/56 locator 64) corresponding to a single-homed network device and a second locator (for example, 1001::/56 locator 64) corresponding to a multi-homed network device are set. The PE23 determines a corresponding segment identifier based on the first locator or the second locator. For the PE23, the single-homed network device is, for example, the CE13 shown in FIG. 1, and the multi-homed network device is, for example, the CE14 shown in FIG. 1. The PE23 and the PE24 are dual-homing devices of the CE14, where the PE23 is a primary PE, and the PE24 is a secondary PE.

The PE23 locally learns routes to the CE13 and the CE14, and allocates a corresponding first segment identifier 1000::1 to the CE13 and the CE14 based on the first locator. The PE23 sends first routing information. The first routing information includes a device identifier of the CE13 and the first segment identifier 1000::1 of the CE13. The PE23 sends second routing information. The second routing information includes a device identifier of the CE14 and the first segment identifier 1000::1 of the CE14.

Optionally, the route in this embodiment of the present disclosure may include a route learned from a CE by using a Border Gateway Protocol (BGP), an imported direct route, a static route, an IGP route, a public/private-network route, or the like.

The PE24 receives the first routing information, and finds, through calculation, that the CE13 is a single-homed device of the PE23. A calculation basis of the PE24 may be, for example, that the PE24 learns routing information of the CE13 only from another PE device, where such routing information may be referred to as, for example, a remote route. However, the PE24 does not learn routing information of the CE13 by using a locally directly connected CE device, where a route determined based on such routing information may be referred to as, for example, a local route. Therefore, the PE24 determines that the first segment identifier 1000::1 in the first routing information is a segment identifier of the single-homed network device.

The PE24 receives the second routing information, and finds, through calculation, that a multi-homing case exists for the CE14. A calculation basis of the PE24 may be, for example, that the PE24 learns a local route corresponding to the CE14, and also learns a remote route corresponding to the CE14. Therefore, actually, the PE24 uses the first segment identifier 1000::1 in the second routing information as a segment identifier of the dual-homed network device. However, this may cause the following problem: The PE24 uses 1000::1 as a segment identifier of both the single-homed network device and the multi-homed network device, and consequently, the PE24 provides mirror protection for the single-homed network device due to a calculation error. In a possible implementation, when finding that a same segment identifier is used by both the single-homed network device and the multi-homed network device, the PE24 determines that mirror protection does not need to be provided for the network device corresponding to the segment identifier.

Subsequently, the routing information is continuously updated. For example, the PE23 learns, from the PE24, a route to the CE14, and therefore determines that the multi-homing case exists for the CE14, and the PE23 accordingly allocates, to the CE14, a new segment identifier, for example, a new VPNSID corresponding to the second locator, and sends routing information including the new VPNSID and a device identifier of the PE23 to the PE24. In this case, when the PE24 finds, through calculation, that the CE14 is the dual-homed network device and the new VPN-SID is used for only the dual-homed network device, the PE24 determines to provide mirror protection for the PE23. Specifically, the PE24 generates mirror protection for the PE23 based on the new VPNSID or the second locator corresponding to the new VPNSID.

FIG. 1 is still used as an example. After receiving the first routing information and the second routing information sent by the PE23, the PE24 sends third routing information corresponding to the CE14.

The PE23 receives the third routing information, learns, from the PE24, the route to the CE14, and determines that the CE14 is multi-homed to the PE23 and the PE24. The PE23 determines that a next-hop combination is (local, PE24, VRF1), that is, the PE23 determines that a packet of a service corresponding to the VRF1 can be routed to the CE14 through the PE23 (local), and can be routed to the CE14 through the PE24. The PE23 re-allocates a second segment identifier 1001::1 to the CE14 based on the next-hop combination (local, PE24) and the second locator. The PE23 sends fourth routing information. The fourth routing information includes the device identifier of the CE14 and the second segment identifier 1001::1 of the CE14.

The PE24 receives the fourth routing information. The PE24 determines that the CE14 is multi-homed to the PE23 and the PE24. The PE24 generates mirror protection for the PE23 based on the second locator 1001::/64 corresponding to the second segment identifier 1001::1. For example, the PE24 generates mirror protection for the PE23 based on the second segment identifier 1001::1.

Figure 5:
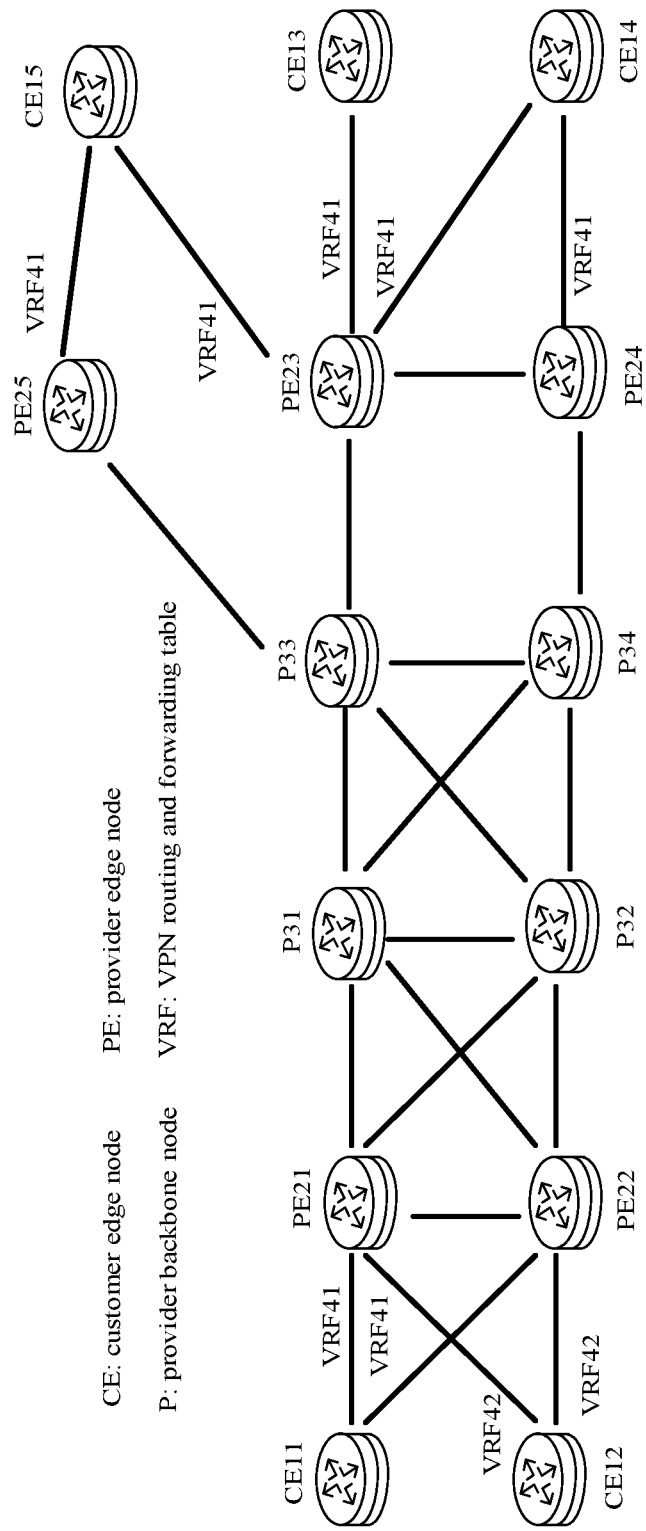
FIG. 5 is a schematic diagram of a network according to an embodiment of the present disclosure.

Based on FIG. 3 and FIG. 4, a specific routing information processing process is described in detail in an embodiment of the present disclosure. Referring to FIG. 5, a PE23 may perform, for example, the method shown in FIG. 3, and a PE24 may perform, for example, the method shown in FIG. 4. In this embodiment of the present disclosure, based on FIG. 1, in FIG. 5, a PE25 and a CE15 are added to a network, and single-homing and dual-homing are combined in the network in FIG. 5. The CE15 is a dual-homed network device, and the CE15 is dual-homed to the PE23 and the PE25. Before the PE25 and the CE15 are connected to the network, for the PE23, refer to the foregoing routing information processing process in FIG. 1. After the PE25 and the CE15 are connected to the network, for the connected PE25 and CE15, specific details are as follows:

After the PE25 and the CE15 are added to the network, for the PE23, a single-homed network device is, for example, a CE13 shown in FIG. 5, and multi-homed network devices are, for example, a CE14 and the CE15 that are shown in FIG. 5. The PE23 and the PE25 are dual-homing devices of the CE15, where the PE23 is a primary PE, and the added PE25 is a secondary PE.

The PE23 learns a local route to the CE15. In this case, the PE23 has not yet learned another remote route to the CE15, and therefore, the PE23 first allocates a corresponding first segment identifier 1000::1 to the CE15 based on a first locator corresponding to the single-homed network device. The PE23 sends fifth routing information. The fifth routing information includes a device identifier of the CE15 and the first segment identifier 1000::1 of the CE15.

The PE25 receives the fifth routing information, and finds, through calculation, that a multi-homing case exists for the CE15. A calculation basis of the PE23 may be, for example, that the PE25 also learns routing information of the CE15 locally. Therefore, actually, the PE25 uses the first segment identifier 1000::1 in the fifth routing information as a segment identifier of the dual-homed network device. However, this may cause the following problem: The PE25 uses 1000::1 as a segment identifier of both the single-homed network device and the multi-homed network device, and consequently, the PE25 provides mirror protection for the single-homed network device due to a calculation error. In a possible implementation, when finding that a same segment identifier is used by both the single-homed network device and the multi-homed network device, the PE25 determines that mirror protection currently does not need to be provided for the network device corresponding to the segment identifier.

Subsequently, the routing information is continuously updated. For example, the PE23 learns, from the PE25, a route to the CE15, and therefore determines that the multi-homing case exists for the CE15, and the PE23 accordingly allocates, to the CE15, a new segment identifier, for example, a new VPNSID corresponding to a second locator, and sends routing information including the new VPNSID and a device identifier of the PE23 to the PE25. In this case, when the PE25 finds, through calculation, that the CE15 is the dual-homed network device and the new VPNSID is used for only the dual-homed network device, the PE25 determines to provide mirror protection for the PE23. Specifically, the PE25 generates mirror protection for the PE23 based on the new VPNSID or the second locator corresponding to the new VPNSID.

Specifically, the PE25 sends sixth routing information corresponding to the CE15.

The PE23 receives the sixth routing information, learns, from the PE25, the route to the CE15, and determines that the CE15 is multi-homed to the PE23 and the PE25. The PE23 determines that a next-hop combination is (local, PE25, VRF1), that is, the PE23 determines that a packet of a service corresponding to the VRF1 can be routed to the CE15 through the PE23, and can be routed to the CE15 through the PE25. The PE23 re-allocates a third segment identifier 1002::1 to the CE15 based on the next-hop combination (local, PE25) and the second locator. The PE23 advertises seventh routing information. The seventh routing information includes the device identifier of the CE15 and the third segment identifier 1002::1. The second locator that is set by the PE23 and that corresponds to the multi-homed network device may be, for example, 1002::/56 locator 64.

The PE24 receives the seventh routing information. Because the PE24 does not learn the routing information of the CE15 locally, the PE24 does not generate mirror protection for the PE23 with respect to the VPNSID of the CE15.

The PE25 receives the seventh routing information. The PE25 determines that the CE15 is multi-homed to the PE23 and the PE25. The PE generates mirror protection for the CE15 based on the second locator corresponding to the third segment identifier 1002::1. For example, the PE25 generates mirror protection for the PE23 based on the second segment identifier 1002::1.

It should be noted that, in another possible implementation, instead of allocating the VPNSID segment identifier corresponding to the first locator to the CE15 whenever the PE23 learns the local route to the CE15, the PE23 may first wait for a period of time after learning the local route to the CE15, and if the remote route to the CE15 is learned within the waiting time period, the PE23 directly allocates the VPNSID segment identifier corresponding to the second locator to the CE15, rather than first allocating the VPNSID segment identifier corresponding to the first locator and then adjusting the VPNSID segment identifier.

Figure 6:
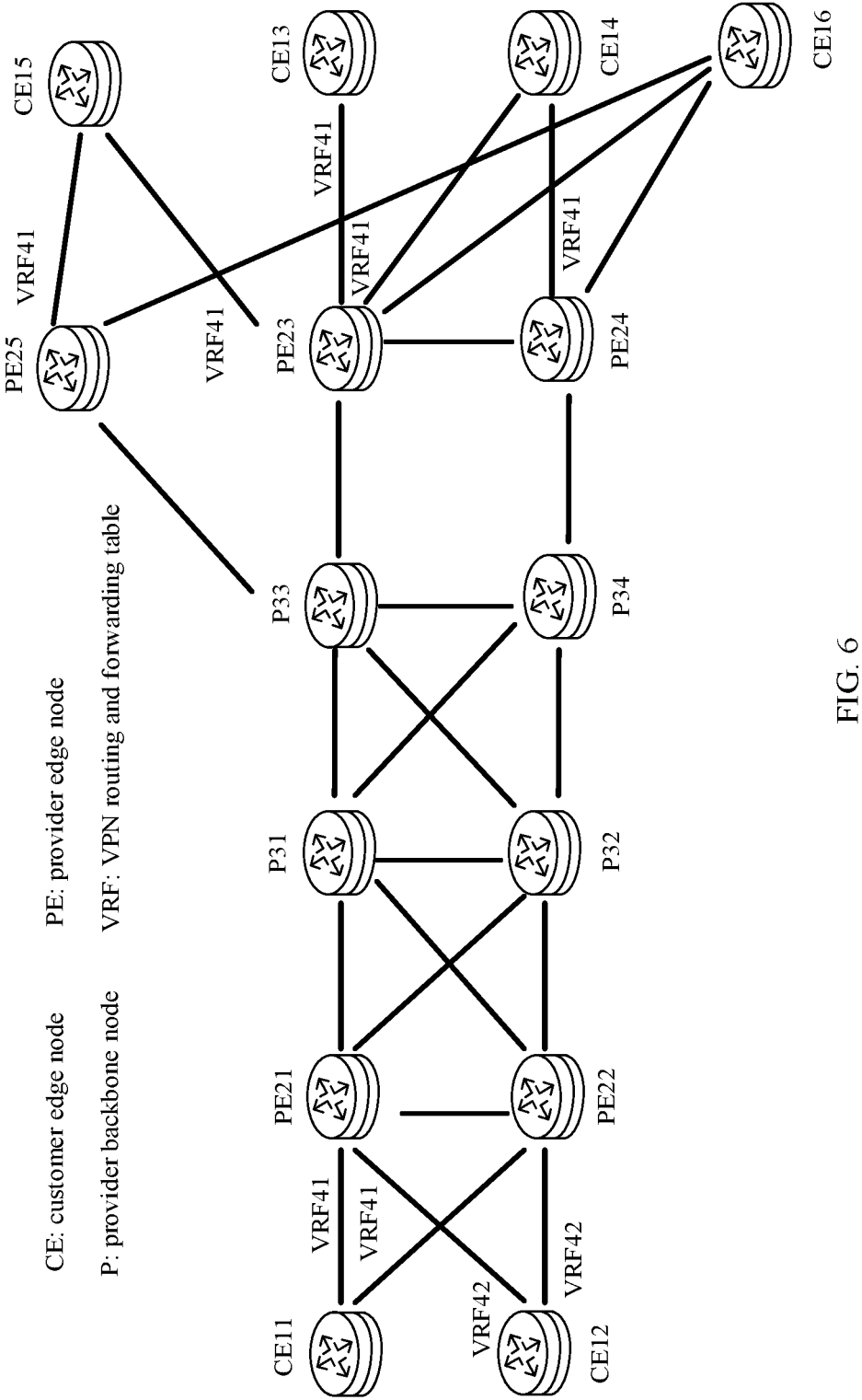
FIG. 6 is a schematic diagram of a network according to an embodiment of the present disclosure.

Based on FIG. 3, FIG. 4, and FIG. 5, a specific routing information processing process is described in detail in an embodiment of the present disclosure. Referring to FIG. 6, a PE23 may perform, for example, the method shown in FIG. 3, and a PE24 may perform, for example, the method shown in FIG. 4. In this embodiment of the present disclosure, based on FIG. 5, in FIG. 6, a CE16 is added to a network, and single-homing, dual-homing, and triple-homing are combined in the network in FIG. 6. The CE6 is a triple-homed network device, and the CE16 is triple-homed to the PE23, the PE24, and a PE25. Before the CE16 is connected to the network, for the PE23, refer to the foregoing routing information processing process in FIG. 1. After the CE16 is connected to the network, for the connected CE16, the following is further included:

The PE23 may find, through calculation, that a multi-homing case exists for the CE16. A calculation basis of the PE23 may be, for example, that the PE23, the PE24, and the PE25 separately learn local routing information of the CE16. Specifically, the PE23 determines that the CE16 is a triple-homed network device, that is, the PE23 determines that a packet can be routed to the CE16 through the PE23, can be routed to the CE16 through the PE24, and can be routed to the CE16 through the PE25.

In a possible implementation, a third locator (for example, 1003::/56 locator 64) specially corresponding to the triple-homed node is further set on the PE23. The PE23 may allocate a corresponding triple-homing segment identifier based on a determined next-hop combination (local, PE24, PE25) and the third locator. Specifically, the PE23 may allocate a corresponding fourth segment identifier 1003::1 to the CE16 based on the next-hop combination (local, PE24, PE25) and the third locator.

In another possible implementation, the PE23 may allocate a corresponding dual-homing segment identifier based on any dual-homing subset, including a local route, in (local, PE24, PE25), and a dual-homing dedicated second locator.

For example, the PE23 may determine, based on a dual-homing subset (local, PE24) or (local, PE25), a segment identifier to be allocated. Specifically, the PE23 may allocate a corresponding segment identifier 1001::1 based on the next-hop combination (local, PE24), or the PE23 may allocate a corresponding segment identifier 1002::1 based on the next-hop combination (local, PE25).

In the foregoing triple-homing case, the PE24 and the PE25 may create mirror protection based on the triple-homing segment identifier, or may create mirror protection based on the dual-homing segment identifier. A specific applicable rule may be determined in advance depending on a requirement.

The P33 may receive first mirror information advertised by the PE24 for the PE23, and also receive second mirror information advertised by the PE25 for the PE23. In this case, the P33 may select one or both of the first mirror information and the second mirror information according to a local policy, to establish a protection path.

Figure 7:
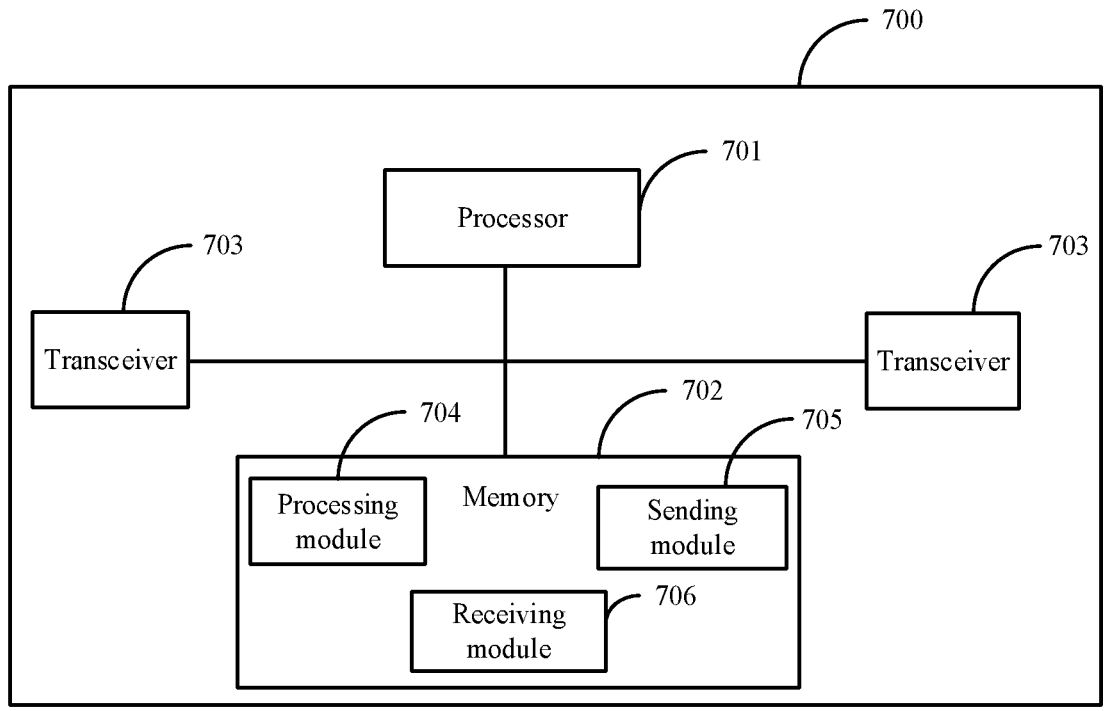
FIG. 7 is a schematic diagram of a structure of a network device according to an embodiment of the present disclosure.

FIG. 7 is a schematic diagram of a network device 700 according to the present disclosure. The network device 700 may be applied to the network architecture shown in FIG. 1, for example, may be the PE3 or PE4 in the network architecture shown in FIG. 1. The network device 700 is configured to perform operations performed by the first network device in FIG. 3 or FIG. 4, or is configured to perform operations performed by any corresponding PE device in FIG. 4, FIG. 5, or FIG. 6.

As shown in FIG. 7, the network device 700 may include a processor 701, a memory 702 connected to the processor 701 through coupling, and a transceiver 703. The processor 701 may be a central processing unit (CPU), a network processor (NP), or a combination of a CPU and an NP. The processor 701 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The processor 701 may be one processor, or may include a plurality of processors. The memory 702 may include a volatile memory, for example, a random access memory (RAM). Alternatively, the memory may include a non-volatile memory, for example, a read-only memory (ROM), a flash memory, a hard disk drive (HDD), or a solid-state drive (SSD). Alternatively, the memory 702 may include a combination of the foregoing types of memories. The memory 702 may be one memory, or may include a plurality of memories. There may be one or more transceivers 703.

In this embodiment, the processor 701 performs corresponding operations according to computer-readable instructions stored in the memory. For example, the processor 701 is configured to determine a first segment identifier corresponding to a second network device, where the first network device is a single-homing device of the second network device, and the first segment identifier corresponds to a first locator; and determine a second segment identifier corresponding to a third network device, where the first network device is a multi-homing device of the third network device, and the second segment identifier corresponds to a second locator. The transceiver 703 is configured to send routing information, where the routing information includes a first device identifier of the second network device and the first segment identifier corresponding to the first device identifier, and a second device identifier of the third network device and the second segment identifier corresponding to the second device identifier; or send first routing information and second routing information, where the first routing information includes a first device identifier of the second network device and the first segment identifier corresponding to the first device identifier, and the second routing information includes a second device identifier of the third network device and the second segment identifier corresponding to the second device identifier.

In a possible implementation, the computer-readable instructions stored in the memory 702 may include a plurality of software modules, for example, a sending module 705, a processing module 704, and a receiving module 706. After executing each software module, the processor 701 may perform a corresponding operation based on an indication of each software module.

Figure 8:
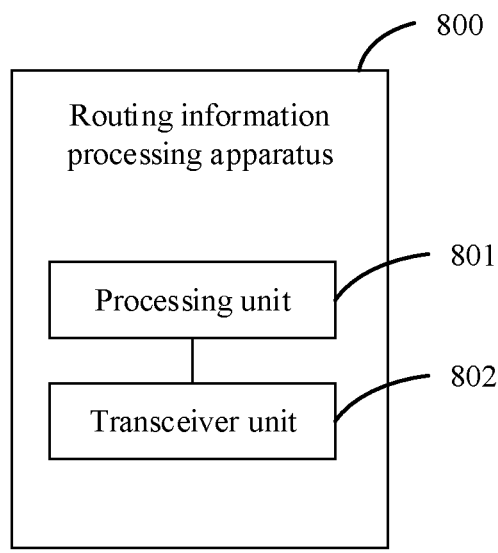
FIG. 8 is a schematic diagram of a structure of a routing information processing apparatus according to an embodiment of the present disclosure.

FIG. 8 is a schematic block diagram of a routing information processing apparatus 800 according to an embodiment of the present disclosure. The route determining apparatus may be the first network device in FIG. 3 or FIG. 4 (or a component having a function of the first network device, or the component may be used in combination with the first network device to support the first network device in implementing a corresponding function), or the PE23 or PE24 in another specific example. The route determining apparatus 800 may exist in a form of software, or may be a chip usable for a device. The route determining apparatus 800 includes a processing unit 801 and a transceiver unit 802. Optionally, the transceiver unit 802 may be further divided into a sending unit (not shown in FIG. 7) and a receiving unit (not shown in FIG. 7). The sending unit is configured to support the route determining apparatus 800 in sending information to another network element. The receiving unit is configured to support the route determining apparatus 800 in receiving information from another network element.

If the route determining apparatus 800 is the first network device mentioned in FIG. 3 or FIG. 4, the processing unit 801 may be configured to support the first network device in FIG. 3 in performing S301 and S304, or support the first network device in FIG. 4 in performing S403, or the like, and/or is used for another process in the solutions described in this specification, for example, corresponding operations performed by the PE23 or the PE24. The transceiver unit 802 is configured to support communication between the first network device and another network element, for example, support the first network device in FIG. 3 in performing S302 and S303 or support the first network device in FIG. 4 in performing S401 and S402, and/or is used for other receiving and sending operations in the solutions described in this specification, for example, corresponding receiving and sending operations performed by the PE23 or the PE24.

It should be noted that the foregoing division manner of the apparatus 800 is an example, and a division into units may be a logical function division. During specific implementation, there may be another division or combination manner, and different division or combination manners do not affect implementation of corresponding functions.

A person skilled in the art should understand that embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, an optical memory, and the like) that include computer-usable program code.

The present disclosure is described with reference to the flowcharts and/or block diagrams of the method, the device (system), and the computer program product according to the present disclosure. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the other programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

Obviously, a person skilled in the art can make various modifications and variations to the present disclosure without departing from the scope of the present disclosure. The present disclosure is intended to cover these modifications and variations of the present disclosure provided that they fall within the scope of protection defined by the following claims and their equivalent technologies.

What is claimed is:

1. A first network device, comprising:
   a memory configured to store a computer program; and;
   a processor coupled to the memory, the processor configured to execute the computer program to cause the first network device to:
      obtain routing information comprising a first segment identifier which corresponds to a second network device and belongs to a first locator, and a second segment identifier which corresponds to a third network device and belongs to a second locator, wherein the first network device is a single-homing device of the second network device, and wherein the first network device is a multi-homing device of the third network device, wherein the first locator is specially allocated for single-homing network devices, and the second locator is specially allocated for multi-homing network devices; and
      send the routing information to a fourth network device which is a multi-homing device of the third network device.

2. The first network device according to claim 1, wherein the computer program when executed by the processor further cause the first network device to:
   receive, from the fourth network device, third routing information sent by the fourth network device, wherein the third routing information comprises comprising a device identifier of the third network device;
   determine, based on the third routing information, that the fourth network device is a multi-homing device of the third network device; and
   determine, based on the fourth network device being the multi-homing device of the third network device, the second segment identifier corresponds to the third network device.

3. The first network device according to claim 1, wherein the computer program when executed by the processor, further cause the first network device to:
   receive a plurality of pieces of routing information;
   determine, based on the plurality of pieces of routing information, that all network devices of a plurality of network devices corresponding to the plurality of pieces of routing information are multi-homing devices of the third network device; and
   determine, based on the network devices being multi-homing devices of the third network device, the second segment identifier corresponding to the third network device.

4. The first network device according to claim 1, wherein the computer program when executed by the processor further cause the first network device to:
   receive, from the fourth network device, a packet originating from a fifth network device, wherein a destination network device of the packet is the second network device, and a link between the fifth network device and the first network device is faulty; and
   send the packet to the second network device.

5. The first network device according to claim 1, wherein the routing information comprises first routing information and second routing information, wherein the first routing information comprises the first segment identifier, and wherein the second routing information comprises the second segment identifier.

6. The first network device according to claim 1, wherein both the first segment identifier and the second segment identifier are VPN SIDs.

7. A first network device, comprising:
   a memory configured to store a computer program; and
   a processor coupled to the memory, the processor configured to execute the computer program to cause the first network device to:
      receive, from a third network device, routing information comprising a first device identifier of a fourth network device, a first segment identifier corresponding to the first device identifier, a second device identifier of a second network device, and a second segment identifier corresponding to the second device identifier, wherein the first network device and the third network device are multi-homing device of the second network device, and wherein the third network device is a single-homing device of the fourth network device; and
      advertise mirror routing information specific to the third network device,
      wherein the mirror routing information comprises the second segment identifier or a second locator corresponding to the second segment identifier and does not comprise the first segment identifier and a first locator corresponding to the first segment identifier.

8. The first network device according to claim 7, wherein the routing information from the third network device comprises first routing information and second routing information, wherein the first routing information comprises the first device identifier of the fourth network device and the first segment identifier corresponding to the first device identifier, and wherein the second routing information comprises the second device identifier of the second network device and the second segment identifier corresponding to the second device identifier.

9. The first network device according to claim 7, wherein the computer program when executed by the processor further cause the first network device to:
receive third routing information comprising the second device identifier of the second network device and the first segment identifier corresponding to the second device identifier;
determine that the first segment identifier corresponds to the second network device and the fourth network device; and
skip advertising the mirror routing information specific to the third network device.

10. The first network device according to claim 7, wherein the computer program when executed by the processor further cause the first network device to: send, before receiving the routing information, fourth routing information to the third network device, wherein the fourth routing information indicates a route to the second network device.

11. The first network device according to claim 7, wherein the computer program when executed by the processor further cause the first network device to:
receive fifth routing information comprising a third device identifier of a fifth network device and a third segment identifier corresponding to the third device identifier and the second locator; and
determine the second locator by aggregating the second segment identifier and the third segment identifier; and
advertise the mirror routing information specific to the third network device, wherein the mirror routing information comprises the second locator and does not comprise the first locator.

12. The first network device according to claim 7, wherein the computer program when executed by the processor further cause the first network device to:
receive a packet from a sixth network device, wherein a destination network device of the packet is the fourth network device; and
send the packet to the third network device.

13. A communication system, comprising:
a fourth network device; and
a first network device configured to:
obtain routing information comprising a first device identifier of a second network device, a first segment identifier corresponding to the first device identifier and a first locator, a second device identifier of a third network device, and a second segment identifier corresponding to the second device identifier and a second locator, wherein the first network device is a single-homing device of the second network device, and wherein the first network device and the fourth network device are multi-homing devices of the third network device; and
send routing information to the fourth network device.

14. The system according to claim 13, wherein the first network device is further configured to:
receive, from the fourth network device, third routing information comprising a device identifier of the third network device;
determine, based on the third routing information, that the fourth network device is a multi-homing device of the third network device; and
determine, based on the fourth network device is the multi-homing device of the third network device, the second segment identifier corresponding to the third network device.

15. The system according to claim 13, wherein the first network device is further configured to:
receive a plurality of pieces of routing information; and
determine, based on the plurality of pieces of routing information, that all network devices of a plurality of network devices corresponding to the plurality of pieces of routing information are multi-homing devices of the third network device; and
determine, based on the network devices being multi-homing devices of the third network device, the second segment identifier corresponding to the third network device.

16. The system according to claim 13, wherein the first network device is further configured to:
receive, from the fourth network device, a packet originating from a fifth network device, wherein a destination network device of the packet is the second network device, and a link between the fifth network device and the first network device is faulty; and
send the packet to the second network device.

17. The system according to claim 13, wherein the routing information comprises first routing information and second routing information, wherein the first routing information comprises the first device identifier of the second network device and the first segment identifier, and the second routing information comprises the second device identifier of the third network device and the second segment identifier.

18. The system according to claim 13, wherein the fourth network device is configured to:
receive the routing information from the first network device; and
advertise mirror routing information specific to the first network device, wherein the mirror routing information comprises one of the second segment identifier and the second locator, and does not comprise the first segment identifier and the first locator.

19. The system according to claim 18, wherein the fourth network device is further configured to: send, before receiving the routing information, third routing information to the first network device, wherein the third routing information indicates a route to the second network device.

20. The system according to claim 18, wherein the fourth network device is further configured to:
receive fourth routing information comprising a third device identifier of a fifth network device and a third segment identifier corresponding to the third device identifier and the second locator; and
determine the second locator by aggregating the second segment identifier and the third segment identifier; and
advertise the mirror routing information specific to the first network device, wherein the mirror routing information comprises the second locator.

* * * * *